(12) United States Patent
Chen et al.

(10) Patent No.: US 6,666,975 B1
(45) Date of Patent: Dec. 23, 2003

(54) METHOD OF REDUCING HYDROGEN SULFIDE ODOR EMISSIONS FROM AN AQUEOUS MEDIUM

(75) Inventors: Zhuo Chen, Yardley, PA (US); Stephen R. Vasconcellos, Doylestown, PA (US)

(73) Assignee: GE Betz, Inc., Trevose, PA (US)

( * ) Notice: Subject to any disclaimer, the term of this patent is extended or adjusted under 35 U.S.C. 154(b) by 0 days.

(21) Appl. No.: 10/264,452

(22) Filed: Oct. 4, 2002

(51) Int. Cl.$^7$ .................................................. C02F 1/58
(52) U.S. Cl. ........................................ 210/749; 423/226
(58) Field of Search ................................ 423/220, 226; 210/749

(56) References Cited

U.S. PATENT DOCUMENTS

| | | | |
|---|---|---|---|
| 1,991,765 A | * | 2/1935 | Marks .......................... 568/75 |
| 2,426,318 A | | 8/1947 | Menaul |
| 2,606,873 A | | 12/1952 | Cardwell et al. |
| 3,459,852 A | | 8/1969 | Roehm |
| 3,514,410 A | | 5/1970 | Engle et al. |
| 3,585,069 A | | 6/1971 | Owsley |
| 3,669,613 A | | 6/1972 | Knox et al. |
| 4,220,550 A | | 9/1980 | Frenier et al. |
| 4,289,639 A | | 9/1981 | Buske |
| 4,310,435 A | | 1/1982 | Frenier |
| 4,532,117 A | * | 7/1985 | Delaney ................... 423/576.2 |
| 4,680,127 A | | 7/1987 | Edmondson |
| 5,004,600 A | * | 4/1991 | Suzuki ...................... 424/76.3 |
| 5,085,842 A | * | 2/1992 | Porz et al. .................. 423/226 |

OTHER PUBLICATIONS

CA:79:149292 abs of JP48003383 Jan. 1973.*
CA:123:151809 abs of Izvestiya Vysshikh Uchebnykh Zavendeni Lesnoi Zhurnal of Nikolaev et al (5–6) pp71–77 1994.*
CA:107:12174 abs of 62084767 Apr. 1987.*

* cited by examiner

Primary Examiner—Jean F. Vollano
(74) Attorney, Agent, or Firm—Duane Morris LLP

(57) ABSTRACT

The present invention is directed to a fast-acting, aqueous phase chemical treatment for reducing the emission of hydrogen sulfide odor from an aqueous medium, e.g., a wastewater or pulping and paper making medium, to the vapor phase. This invention comprises adding an effective amount for the purpose of glyoxal to the desired hydrogen sulfide-containing medium.

3 Claims, 4 Drawing Sheets

METHOD OF REDUCING HYDROGEN SULFIDE ODOR EMISSIONS FROM AN AQUEOUS MEDIUM

BACKGROUND OF THE INVENTION

This invention relates to a fast-acting, aqueous phase chemical treatment for reducing the emission of hydrogen sulfide odor from an aqueous medium to the vapor phase.

The reactivity between various aldehydes and sulfidic compounds ($H_2S$, mercaptans, etc.) has been known in the art for sometime. For example, Marks in U.S. Pat. No. 1,991,765 discloses a method of reacting hydrogen sulfide and an aldehyde in an aqueous solution having a pH between 2 and 12 at a temperature between substantially 20° C. and 100° C. After Marks'disclosure in 1935, many patents appeared disclosing the use of aldehydes during acid cleaning of iron sulfide deposits, including U.S. Pat. Nos. 2,606, 873; 3,514,410; 3,585,069; 3,669,613; 4,220,550; 4,289, 639; and 4,310,435. Consumption of the hydrogen sulfide liberated by acidification of sulfide-containing deposits increased the safety of such operations. Decreased corrosivity of the aldehyde-containing acids is also disclosed in the prior art, sometimes with the addition of ancillary corrosion inhibitors.

Menaul in U.S. Pat. No. 2,426,318 discloses a method of inhibiting the corrosive action of natural gas and oil containing soluble sulfides on metals by utilizing an aldehyde and preferably formaldehyde.

Roehm in U.S. Pat. No. 3,459,852 discloses a process for deodorizing and reducing the biochemical demand of an aqueous solution which contains at least one compound of hydrogen sulfide and compounds containing the—SH group. Roehm's process comprises mixing the solution with a sulfide-active alpha, beta unsaturated aldehyde or ketone in an amount sufficient to form sulfur-containing reaction product of the sulfide active aldehyde or ketone. More specifically, Roehm's invention resides in the use of compounds having the following alpha, beta unsaturated aldehyde or ketone moiety as the reactive portion:

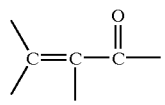

Two such sulfide-active compounds disclosed by Roehm are acrolein and 3-buten-2-one.

Formaldehyde, formaldehyde with $SO_3^{-2}$, and acrolein are all commercially used hydrogen sulfide ($H_2S$) scavengers. However, formaldehyde produces a solid reaction product and reverts readily to formaldehyde and free $H_2S$. Acrolein is more expensive than formaldehyde as well as extremely toxic and dangerous to handle. The use of $SO_3^{-2}$ with formaldehyde eliminates the re-release of $H_2S$ but not solids formation.

Despite the prior art approaches to $H_2S$ scavenging, the provision of a single compound or group of compounds capable of providing the $H_2S$ scavenging function while not producing a solid reaction product and without stringent handling problems is highly desirable from a commerical point of view. Such a compound or compounds would provide suitable $H_2S$ scavengers for systems where solids must be avoided. These needs are effectively met by utilization of the hydrogen sulfide scavenging methods of the present invention.

BRIEF DESCRIPTION OF THE DRAWINGS

These and other objects, features and advantages of the present invention will be more fully disclosed in the following Detailed Description of the Preferred Embodiments of the invention, which are to be considered together with the accompanying figures wherein.

DESCRIPTION OF THE PREFERRED EMBODIMENTS

The present invention relates to a fast-acting, aqueous phase chemical treatment for reducing the emission of hydrogen sulfide odor from an aqueous medium to the vapor phase.

In a preferred embodiment, the present invention relates to the utilization of glyoxal to treat an aqueous medium containing sulfide species, in order to reduce the emission of hydrogen sulfide odor to the vapor phase by addition of an effective amount of the agent to the aqueous medium. The agent reacts with sulfide species to form a soluble, non-volatile compound to reduce the emission of hydrogen sulfide from the aqueous phase to the vapor phase.

It has been found that glyoxal is effective and fast-acting in reducing the emission of hydrogen sulfide odor from an aqueous medium with an acidic to neutral pH. The effective treatment dosage was found to increase with decreasing pH of the medium.

The invention will be further illustrated by the following examples, which are included as being illustrations of the invention and which should not be construed as limiting the scope thereof.

EXAMPLES

The test protocol for monitoring the vapor phase hydrogen sulfide level was as follows: A 100 ml sample of wastewater was placed in a small beaker; with moderate stirring, the pH of the sample was measured. Stirring was continued for one minute, even if the wastewater sample was the baseline with no treatment.

The wastewater sample was then placed in a test bottle; the bottle was securely stoppered. The sample was mixed for one minute, and left standing for five minutes. A Drager tube was chosen for testing, where the expected concentration of headspace $H_2S$ falls in mid-range. The Drager tube was then inserted into a sample port, rubber tubing was attached from an Accuro® pump to the Drager tube, and a sample was pulled using a single stroke. The headspace concentration of $H_2S$ from the tube scale was then read. For evaluating treatments, after measuring the pH of the wastewater sample, the treatment was added using a micropipette or syringe, and stirring continued for one more minute; the final pH was noted before proceeding to the next steps.

Figure 1:
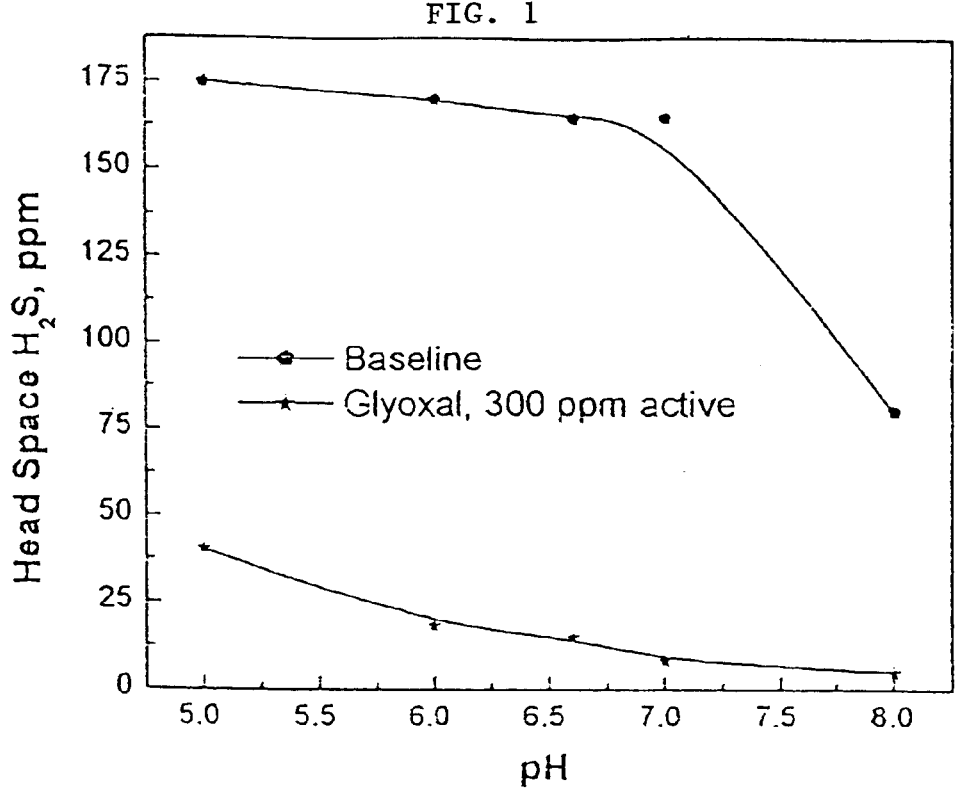
FIG. 1 is a graph of the effect of pH on $H_2S$ odor eliminating efficacy using 300 ppm glyoxal.
Figure 2:
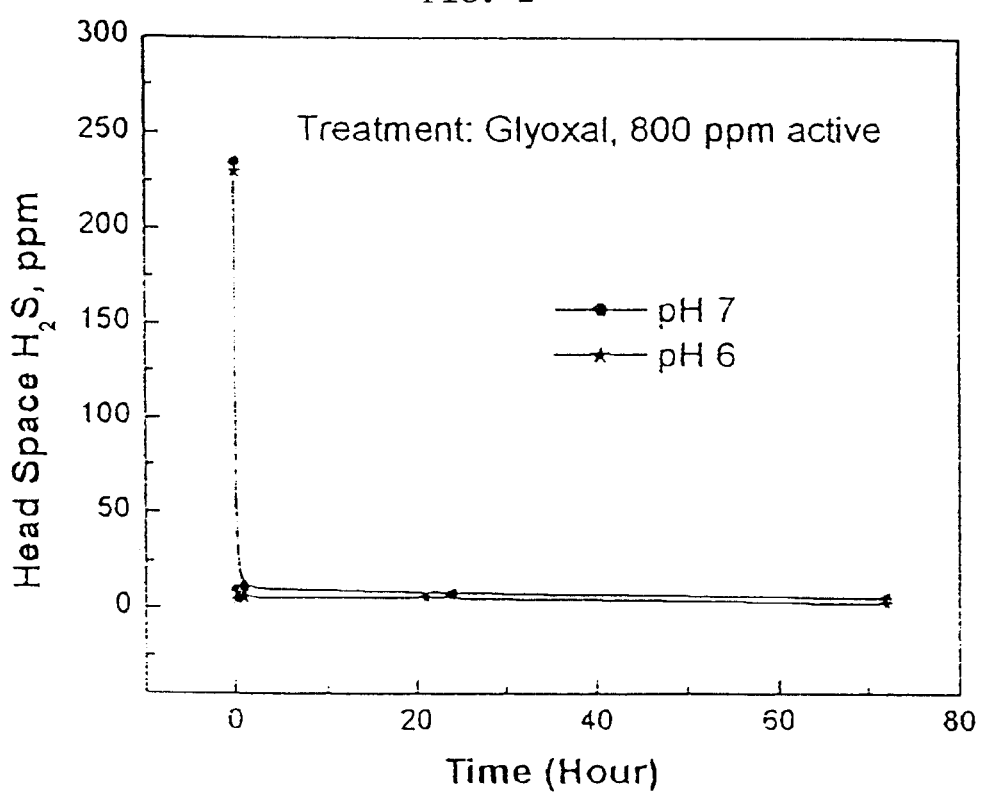
FIG. 2 is a graph of the stability of the reaction product as a function of time at room temperature.
Figure 3:
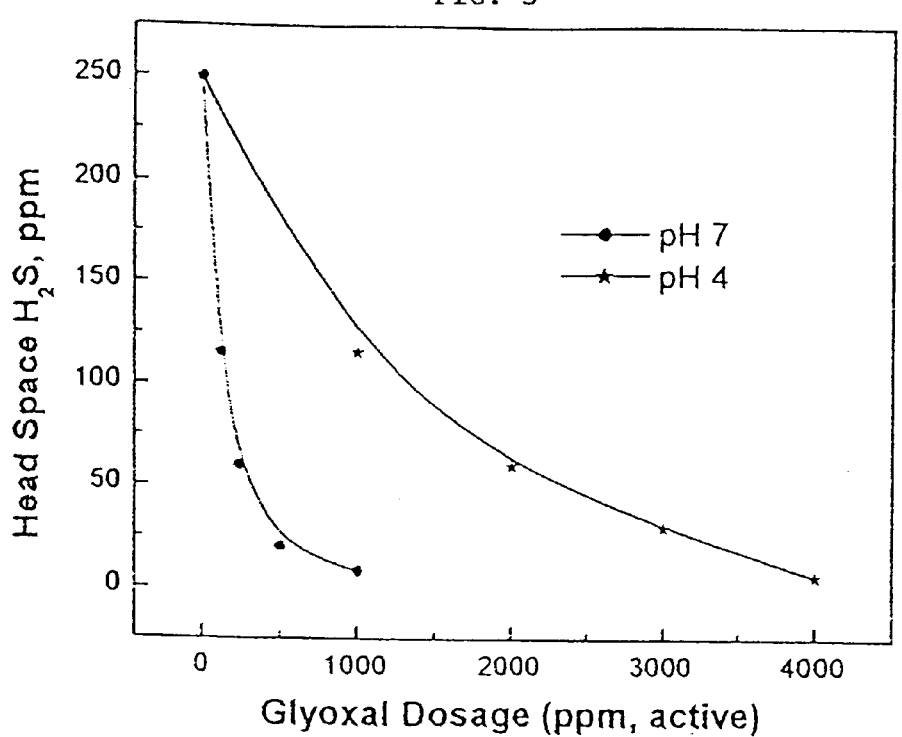
FIG. 3 is a graph of dosage curves at pH 4 and 7.
Figure 4:
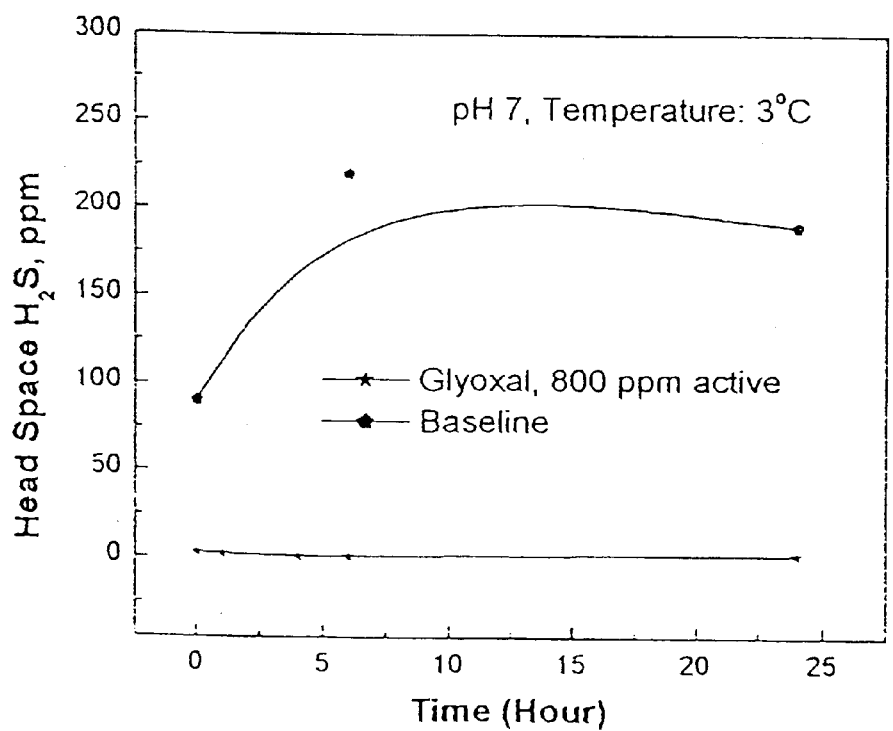
FIG. 4 is a graph of the stability of the reaction product as a function of time at near-freezing substrate temperatures.
Figure 5:
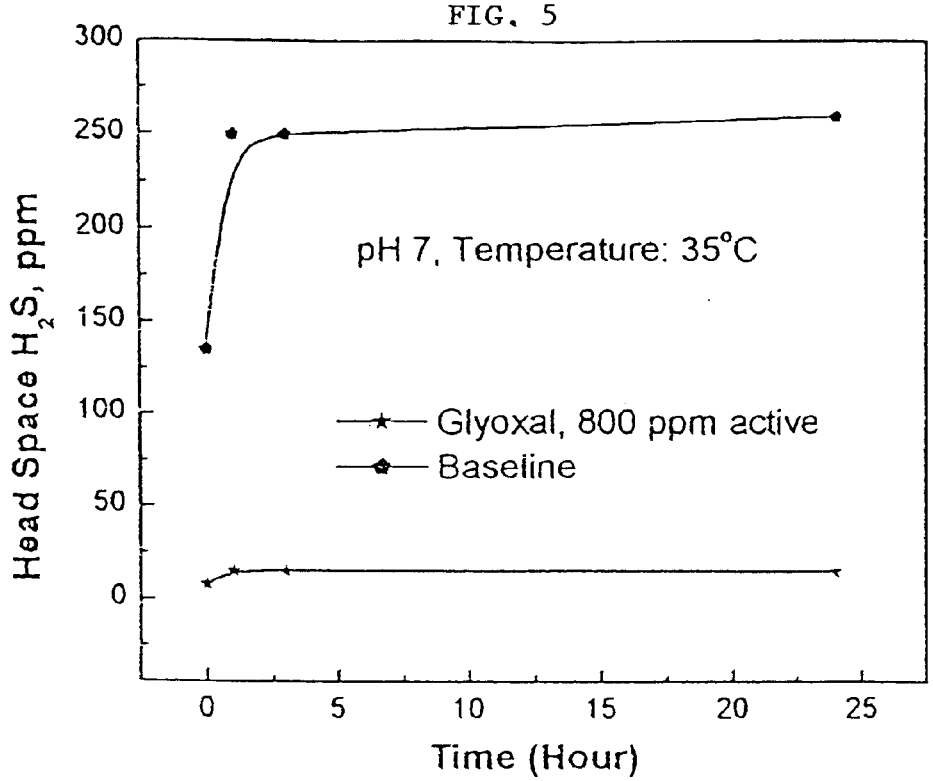
FIG. 5 is a graph of the stability of the reaction product as a function of time at elevated substrate temperatures.

As shown in FIGS. 1–3, glyoxal is an effective and fast-acting treatment for reducing the emission of hydrogen sulfide odor from aqueous media with acidic to neutral pHs. Glyoxal greatly outperformed the Baseline (pH control) treatment (FIG. 1). Note the rapid activity of the treatment of the present invention at acidic and neutral pHs (FIG. 2). In FIG. 3, note also that the effective treatment dosage increased with decreasing pH of the medium. As further shown in FIGS. 4 and 5, the reaction product formed between glyoxal and aqueous sulfide species was stable with time and temperature, ranging from about 3° C. to about 35° C., although the present invention is expected to be effective within a temperature range of from about 0° C. to about 50° C.

Figure 6:
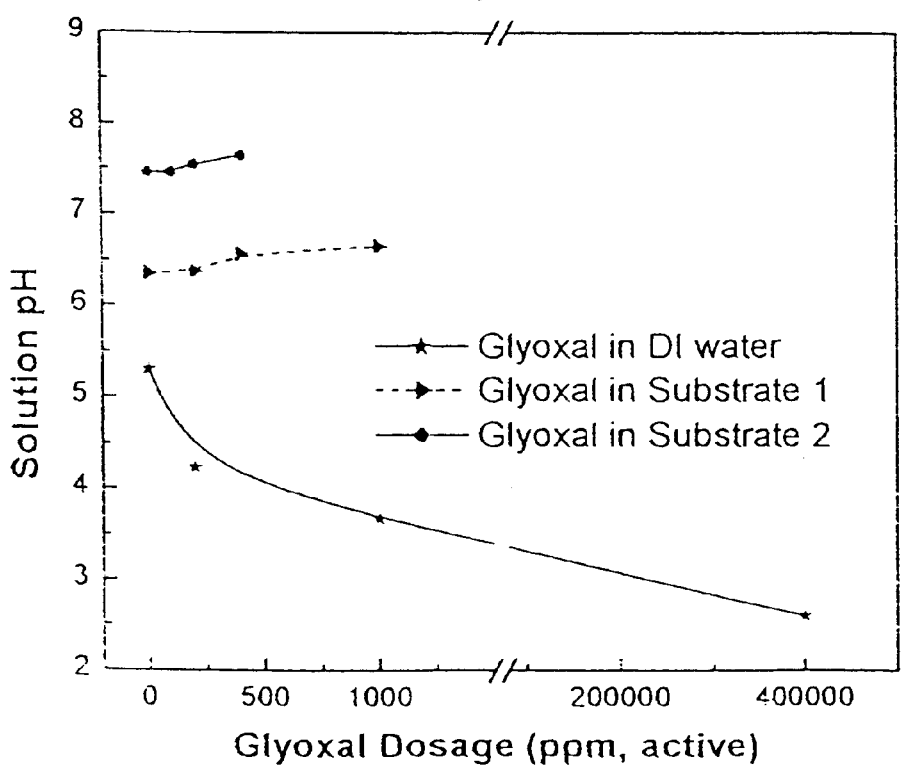
FIG. 6 is a graph of solution pH change as a function of glyoxal dosage.
Figure 7:
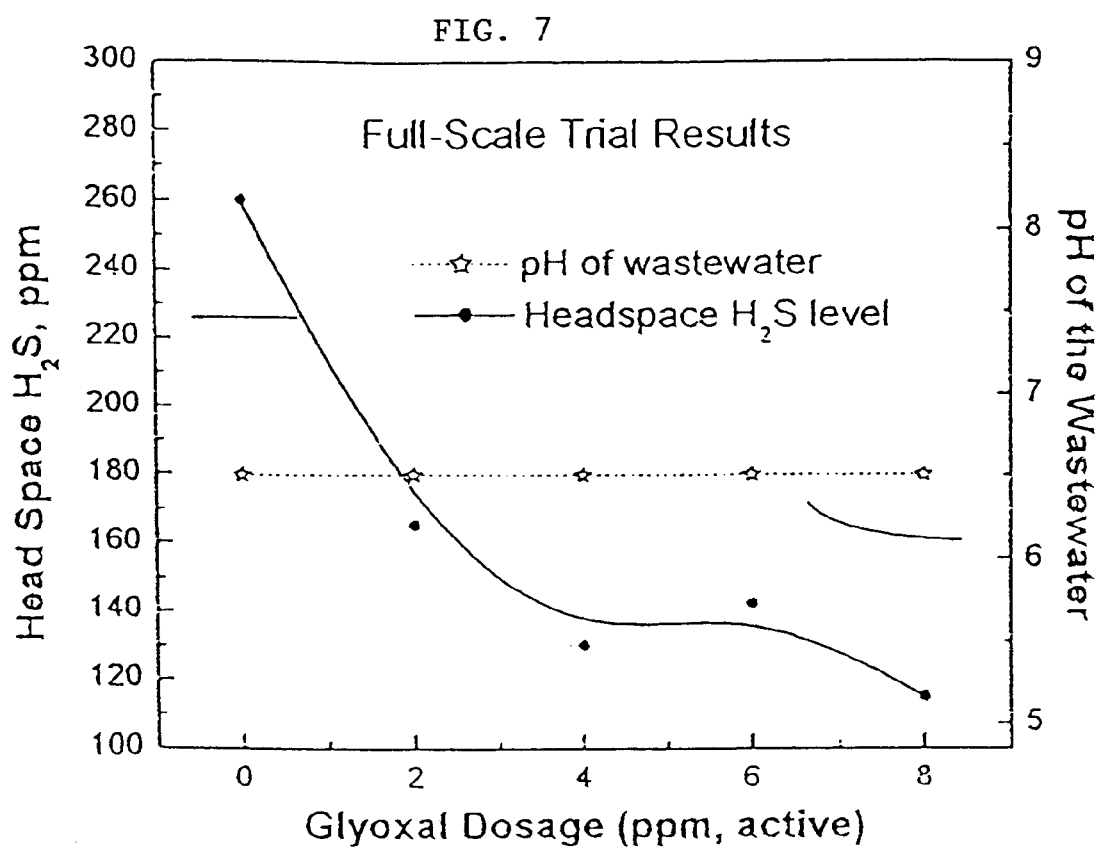
FIG. 7 is a graph of a full-scale trial conducted at a wastewater treatment facility, where the wastewater had a high COD (chemical oxygen demand) content.

As shown in FIGS. 6 and 7, the treatment of the present invention did not significantly alter the pH of the medium at any application dosage. In a further preferred embodiment of the present invention, the pH of the aqueous medium is from about 4 to about 7, with a pH of the medium of about 6–7 being particularly preferred.

While the present invention has been described with respect to particular embodiment thereof, it is apparent that numerous other forms and modifications of the invention will be obvious to those skilled in the art. The appended claims and this invention generally should be construed to cover all such obvious forms and modifications, which are within the true spirit and scope of the present invention.

We claim:

1. A method for reducing the emission of hydrogen sulfide odor in a hydrogen sulfide-containing, wastewater aqueous medium, wherein said aqueous medium as an acidic pH, which method consists essentially of adding to the wastewater aqueous medium an effective amount for the purpose of a glyoxal.

2. The method as recited in claim 1, wherein the addition is conducted at a temperature of from about 0° C. to about 50° C.

3. The method as recited in claim 2, wherein the addition is conducted at a temperature of from about 3° C. to about 35° C.

* * * * *